Aug. 9, 1932.  O. L. COMPTER ET AL  1,871,113

CUP, ADHERENT THROUGH MECHANICAL PRESSURE

Filed Jan. 20, 1931

Inventors,
Otto Luis Compter
and Julio Menard,

By

Attorney

Patented Aug. 9, 1932

1,871,113

UNITED STATES PATENT OFFICE

OTTO LUIS COMPTER AND JULIO MÉNARD, OF BUENOS AIRES, ARGENTINA

CUP, ADHERENT THROUGH MECHANICAL PRESSURE

Application filed January 20, 1931. Serial No. 510,040.

This invention consists of a new type of cup, adherent by mechanical pressure, which due to its characteristics, allows it to adhere perfectly to any smooth surface, and in such a manner, that it can be utilized for hanging thereon diverse objects, such as for instance, cards, advertising matter etc. as well as also to sustain shelves for the exhibition of goods, or things of a similar character. This invention may also be dedicated to other uses, as will be explained hereafter.

In order that this invention may be comprehended, and put into practise without any difficulty, we have in the attached drawing, represented it under different aspects, as follows:—

Figure 1:
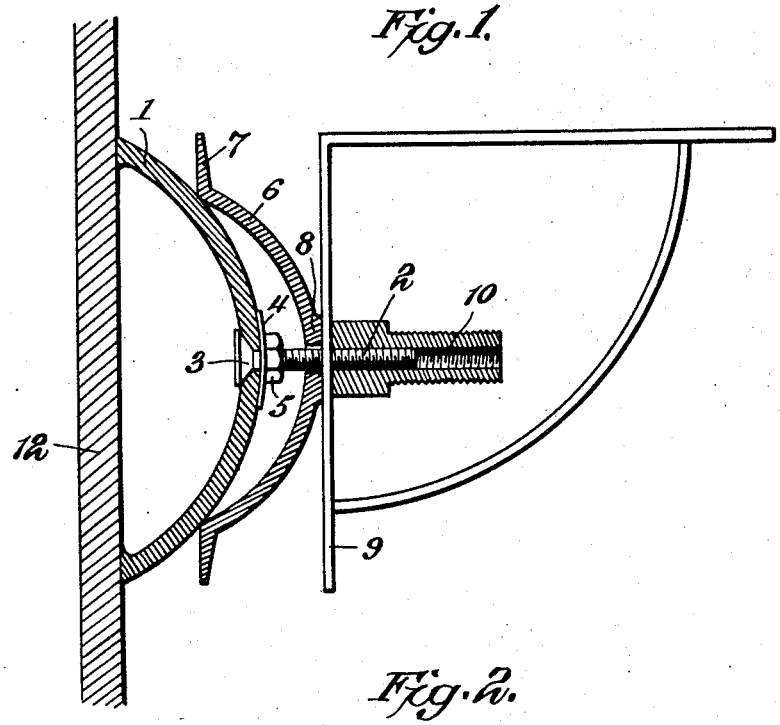

Fig. 1 offers a diametrical vertical cut of this cup, showing the manner in which it can be used to hold up a small shelf.

Figure 2:
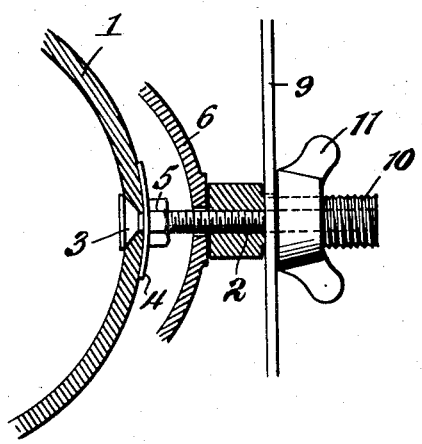

Fig. 2 represents a modification with respect to the joining of the support of the shelf, and the cup referred to.

As shown in the attached drawing, this new type of cup is formed by piece 1, made of india-rubber, or of any other elastic material, suitable for that purpose, under a spherical form.

This is the piece which really constitutes the cup itself, and is perforated so as to allow the passage of the screw 2, which as may be seen by reference to the attached drawing, is provided with a flat head 3, adapted to the inside of the cup, adhering or being clamped firmly to it. The fixing of the screw 2 to the cup 1 is done by means of a metallic washer 4, slightly curved, so that it adapts itself perfectly to the round outside surface of the cup, said washer being adjusted by the use of a nut 5, firmly screwed in, with the object of preventing, by pressure of the washer, the passing of air through the orifice. The washer may also be directly screwed on the cup, whereby the use of the nut is avoided.

When the head of the screw has not entered into the body of the cup 1, it can be covered by a suitable covering, made of suitable material, which must be adhered or vulcanized to the cup, in order to prevent the entrance of air therein.

A second spherical cup 6 is used to cover part or all of the outside of the cup 1, the member 6 being made of metallic plates or of any other similar material, with sufficient power of resistance, with a flat rim 7, of sufficient width, which as may be seen by reference to the attached drawing, obliges the edges of the cup to adhere with still greater strength to the surface.

The member 6 has a perforation to allow the passage of screw 2 and forms a slight protuberance 8 against which is placed the vertical support 9, which is also perforated by screw 2, and which is adjusted by means of bolt 10 with an interior thread, which screws on to screw 2. This bolt 10 may be substituted by the use of a simple nut, or any other object useful for the same purpose.

As may be observed, the bolt 10 may also be provided with an outside thread, so as to allow the screwing in of the support or auxiliary arm or arms, or of any other piece to extend it.

Fig. 2 shows another method of placing the arm or support 9, which in this instance, has been placed on bolt 10 and can be adjusted by the use of nut 11.

It is evident that this support 9 could also be screwed directly on the exterior thread of bolt 10, without requiring the nut 11. The arm or support 9 could be substituted by hooks, bars, etc., which may be screwed on the outside of bolt 10, so as to allow the direct suspension of the objects it is required to exhibit thereon.

The practical use of this device is extremely simple, as is now to be explained.

In order to make the cup adhere perfectly to the surface 12, which might, for instance be the glass surface of a show case, we must first adjust the screw 2 by means of the washer 4 and the nut 5. Then we place on it the cup 6 and the support 9, screwing in the nut 10 on screw 2.

When screwing in this nut 10, care must be taken to strongly push cup 6 against the cup 1, so that the edge 7 of the former, pressing on the edge of the cup 1, due to the screwing in, will augment the adherence of the cup to the smooth surface 12. For greater support, two or more similar cups must be employed, and to each of them a support will be provided with cross bars, tables, etc., which constitute the shelves themselves. The cup 1 may be provided on its outside with a groove of a peripheral nature, which must coincide with the level of the rim 7 of cup 6, in such a manner as to facilitate the entry of that rim, or another rim on which cup 6 can be adjusted; the cup may have on the outside of its rim and on the overrim a thread to allow the screwing of cup 6 thereto. A ring or suitable frame may also be fixed or vulcanized on the upper part of the cup 1, said ring being provided with an overrim or slot, preferably with screw-threads, in order to allow the fixing or screwing of the cup 6 which will be then made up in correspondence with the cup.

Moreover, cup 6 may also be provided with screws, openings, rims or channels, so as to allow screwing in or attachment of supports, arms, hooks or bars, as well as of the screwing of this cup on to the cup 1. This cup can be replaced by the use of a spring or of any other similar nature, which would compel the edge of the cup to adhere to the surface on which it is to be fixed.

If it be so required, we can hang objects directly to the cup itself, and the latter can be provided with one or more peripherical extensions of its rim, (not shown in drawing), like ears. These latter may be solid or perforated, and if required, may also be small cups.

As may be observed by reference to the attached drawing, this type of cup differs completely from all similar cups, as it allows the fixing of screws to it, and on it we adapt exterior coverings whose principal object is, as we explain, the augmentation of the power of adherence of the cup itself.

The utility and working of this invention is quite clearly explained, and requires no further detailing for technical persons. It is also evident that modifications may be introduced in certain of its details, without losing its chief characteristics.

We claim:

A suction cup, comprising a semispherical elastic member adapted to contact with a smooth surface, a semispherical metallic member positioned on the exterior surface of the elastic member and having a rim adapted to press against the elastic member, a threaded screw passing through the elastic member and the metallic member and having its head fixed to the elastic member by means of an air-tight joint, and means cooperating with the screw for varying the contact between the metallic member and the elastic member to control the suction within the elastic member when the latter is in contact with the smooth surface, said contact varying means being provided with an exteriorly threaded portion of reduced size and means associated with said exteriorly threaded portion for securing articles thereon.

In testimony whereof we affix our signatures.

OTTO LUIS COMPTER.
JULIO MÉNARD.